United States Patent
Wesley

(10) Patent No.: US 10,434,926 B2
(45) Date of Patent: Oct. 8, 2019

(54) AIRLIFT SHORING

(71) Applicant: John M. Wesley, Mustang, OK (US)

(72) Inventor: John M. Wesley, Mustang, OK (US)

( * ) Notice: Subject to any disclaimer, the term of this patent is extended or adjusted under 35 U.S.C. 154(b) by 121 days.

(21) Appl. No.: 15/731,287

(22) Filed: May 18, 2017

(65) Prior Publication Data

US 2018/0334080 A1    Nov. 22, 2018

(51) Int. Cl.
| | | |
|---|---|---|
| *B60P 7/13* | (2006.01) | |
| *B60P 7/135* | (2006.01) | |
| *B64D 9/00* | (2006.01) | |
| *B66F 17/00* | (2006.01) | |
| *B63B 25/24* | (2006.01) | |
| *B64F 1/16* | (2006.01) | |
| *B60P 1/43* | (2006.01) | |

(52) U.S. Cl.
CPC .............. *B60P 7/135* (2013.01); *B63B 25/24* (2013.01); *B64D 9/00* (2013.01); *B64F 1/16* (2013.01); *B66F 17/00* (2013.01); *B60P 1/43* (2013.01); *B66F 2700/09* (2013.01)

(58) Field of Classification Search
CPC ........... B60P 7/0853; B60P 7/08; B60P 7/083; B60P 7/135; B60P 7/16; B60P 3/00; B60P 7/0846; B60P 7/0884; B60P 7/15; B63B 25/04; B63B 25/12; B63B 25/14; B63B 25/24; B63B 43/00; B64D 3/00; B64D 43/00; B64D 9/00
USPC .. 410/156, 100, 103, 96, 121, 2, 94, 92, 91, 410/84, 80; 206/319, 335, 386, 593, 814, 206/503, 504, 600; 414/341, 448, 522, 414/930, 923, 812
See application file for complete search history.

(56) References Cited

U.S. PATENT DOCUMENTS

| | | | | |
|---|---|---|---|---|
| 4,498,648 A | * | 2/1985 | DeLuca | B64C 1/22 244/118.3 |
| 4,732,803 A | * | 3/1988 | Smith, Jr. | B32B 7/02 428/212 |
| 5,085,382 A | * | 2/1992 | Finkenbeiner | B64C 1/10 188/371 |
| 5,472,297 A | * | 12/1995 | Heselden | E02D 29/0208 405/258.1 |
| 6,608,262 B1 | | 8/2003 | Eiswerth | |
| 6,695,554 B2 | | 2/2004 | Afful | |
| 7,931,428 B2 | | 4/2011 | Stille | |
| 7,975,963 B2 | | 7/2011 | Merz | |
| 9,267,282 B2 | * | 2/2016 | Vieira Da Cunha | E02D 29/025 |
| 2010/0181421 A1 | * | 7/2010 | Albagli | B64C 25/56 244/100 A |
| 2011/0041266 A1 | * | 2/2011 | Wyse | B65G 69/30 14/72.5 |

(Continued)

*Primary Examiner* — D Glenn Dayoan
*Assistant Examiner* — Sunsurraye Westbrook
(74) *Attorney, Agent, or Firm* — Randal D. Homburg

(57) ABSTRACT

Shoring blocks used as pedestal shoring under the cargo loading ramps of cargo planes and also used as sleeper shoring to support the weight of rolling stock loaded into cargo aircraft provide stackable foam structures of various and applicable shapes and sizes designed for particular cargo aircraft, each foam structure alternatively provided with a protective coating or fabric, reinforced with a stiffener or having fabric webbing integrated within or connecting more than one foam structure.

15 Claims, 6 Drawing Sheets

(56) References Cited

U.S. PATENT DOCUMENTS

2013/0280003 A1\* 10/2013 Wessel .................. B60P 3/077
　　　　　　　　　　　　　　　　　　　　　410/30
2017/0174115 A1\* 6/2017 Frost ................... B60P 3/1025

\* cited by examiner

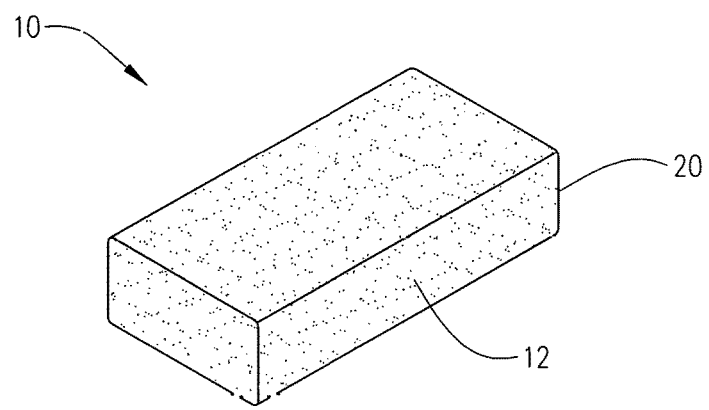
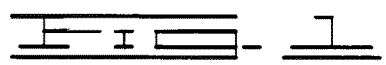
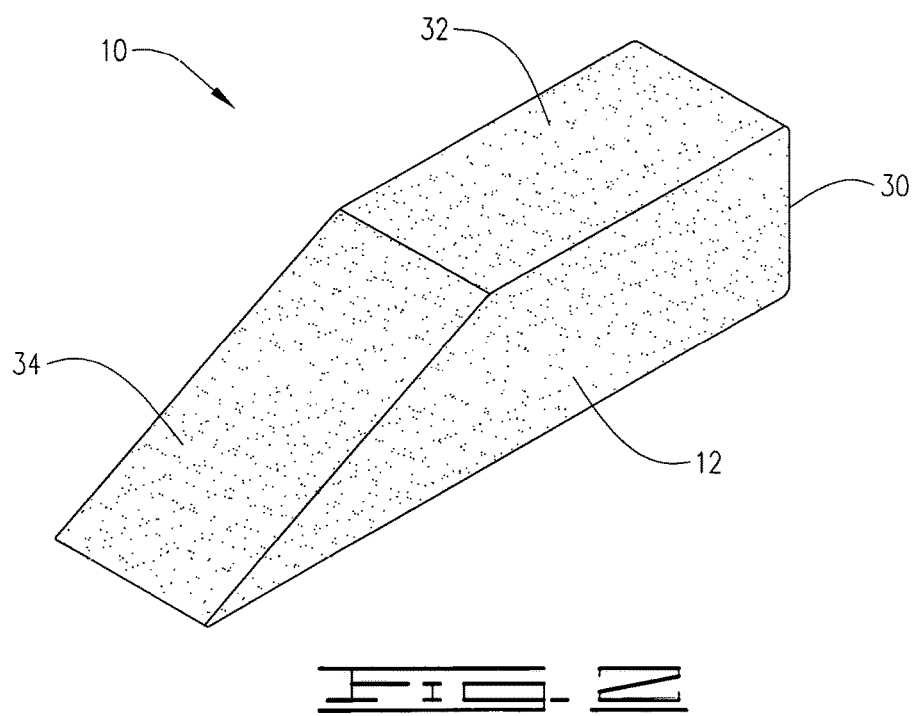
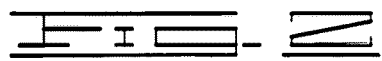

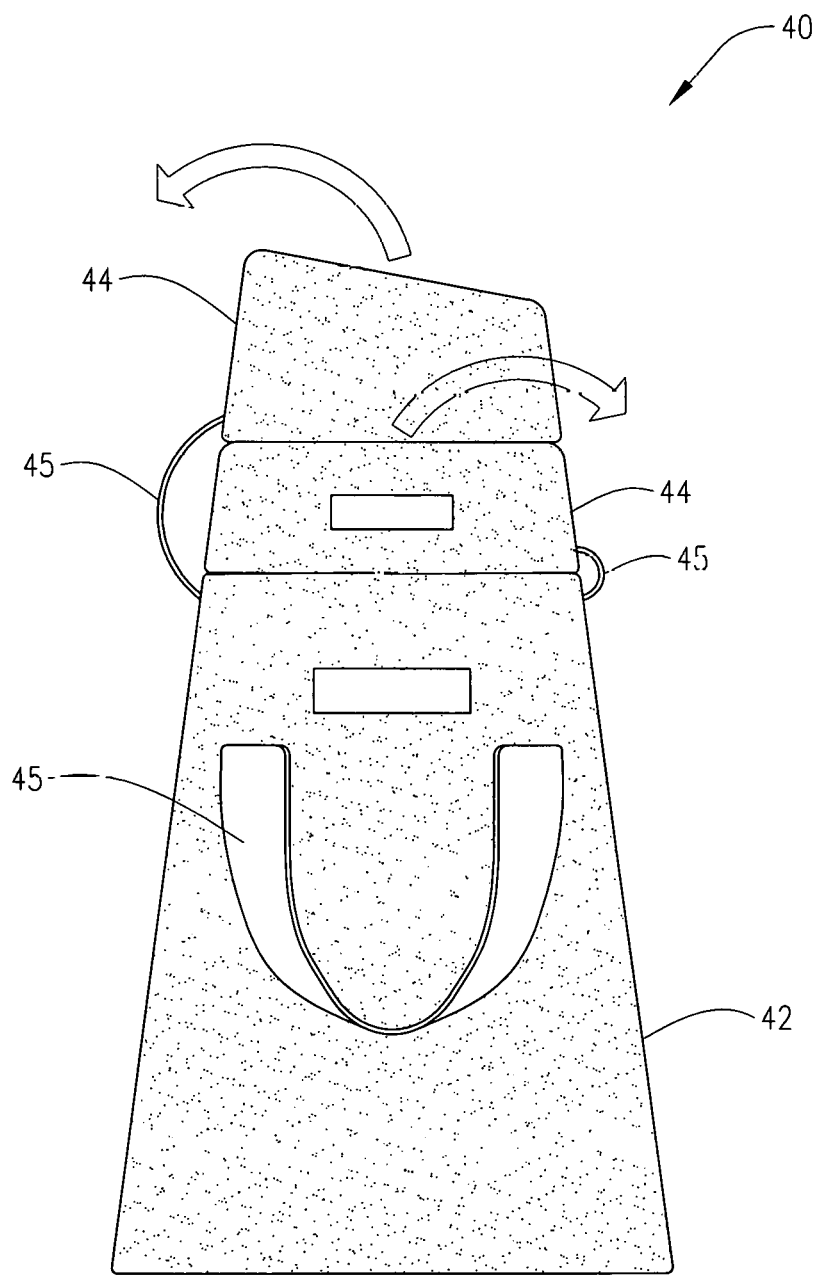
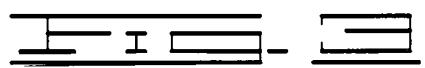

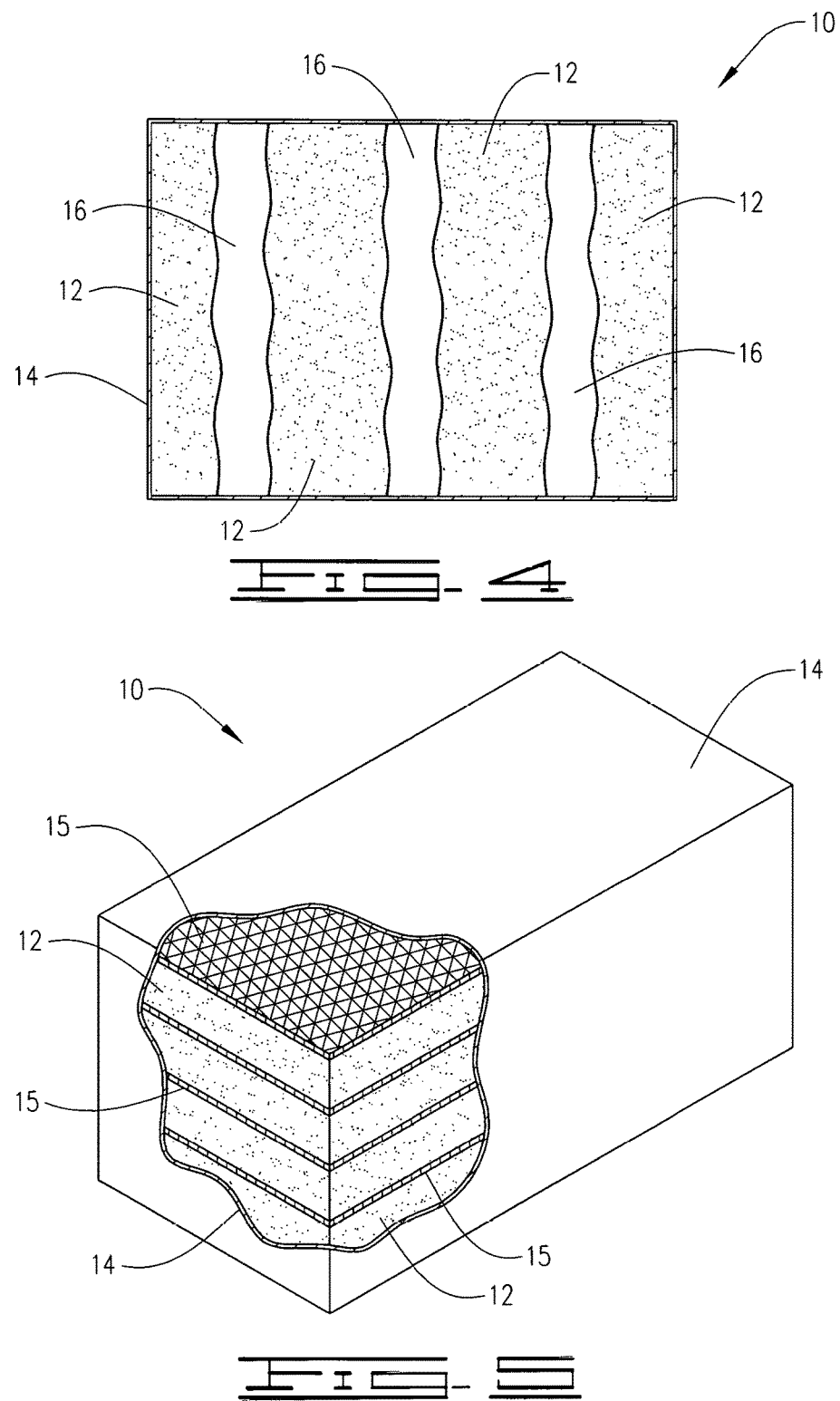

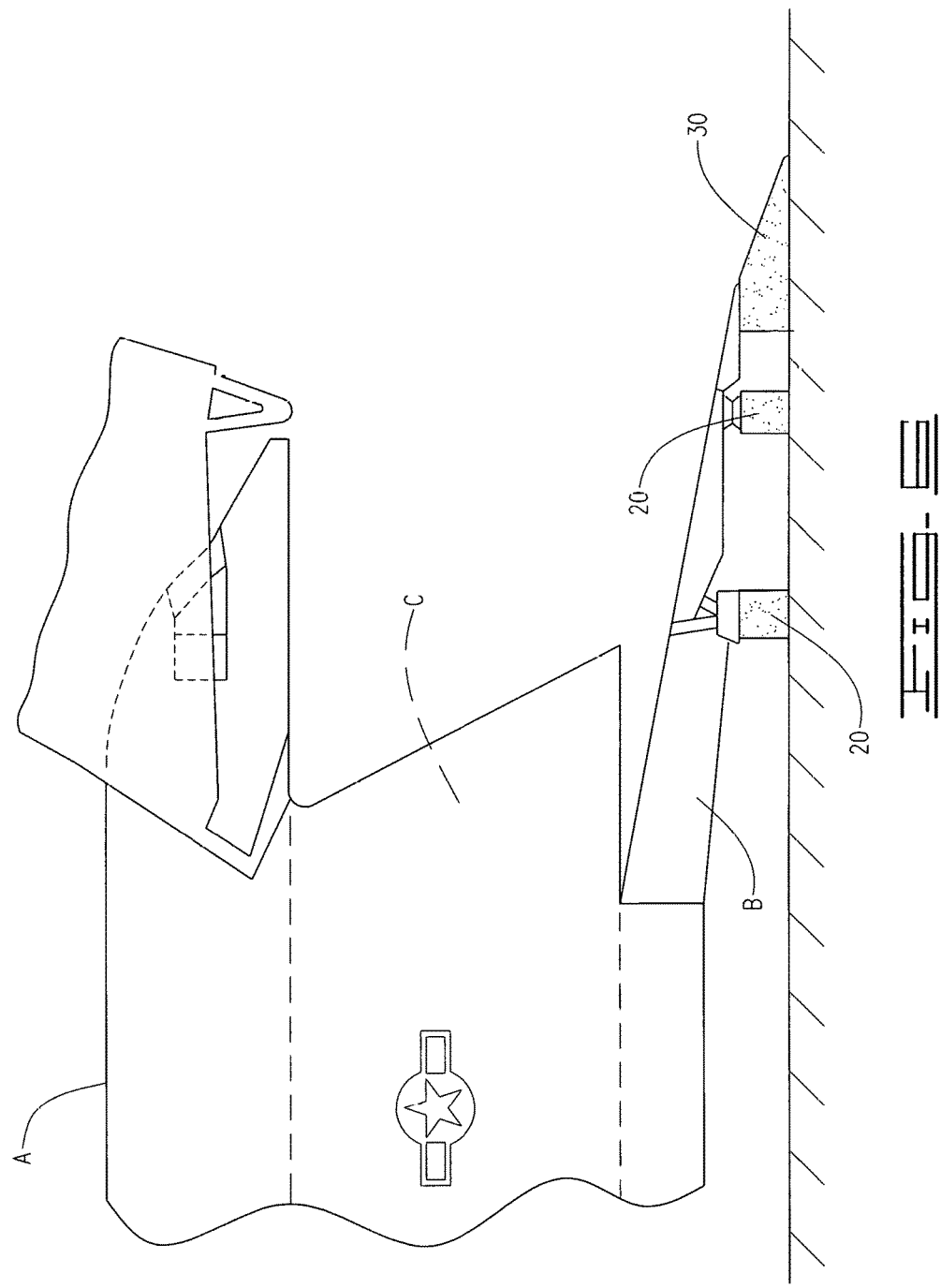

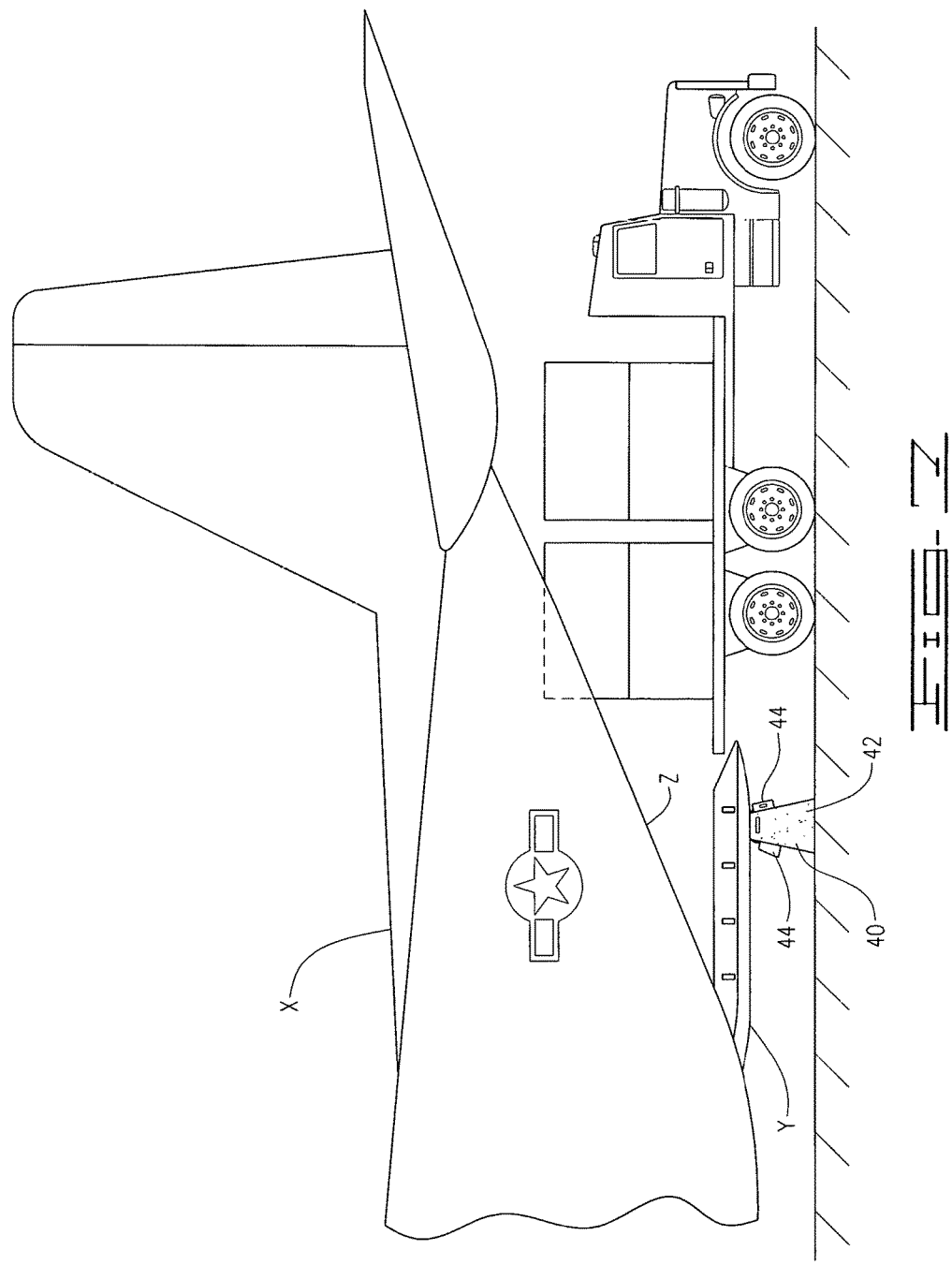

AIRLIFT SHORING

I. BACKGROUND OF THE INVENTION

1. Field of Invention

Shoring blocks used as pedestal shoring under the cargo loading ramps of cargo planes and also used as sleeper shoring to support the weight of rolling stock loaded into cargo aircraft provide stackable foam structures of various and applicable shapes and sizes designed for particular cargo aircraft, each foam structure alternatively provided with a protective coating or fabric, reinforced with a stiffener or having fabric webbing integrated within or connecting more than one foam structure.

2. Description of Prior Art

A preliminary review of prior art patents was conducted by the applicant which reveal prior art patents in a similar field or having similar use. However, the prior art inventions do not disclose the same or similar elements as the present airlift shoring structures, nor do they present the material components in a manner contemplated or anticipated in the prior art.

An air bag safety system is provided within a cargo aircraft which deploys in the event of an emergency to protect the cargo and the aircraft interior in U.S. Pat. No. 7,975,963 to Merz. Merz does not provide shoring for loading doors or for placement beneath rolling stock for vertical stability and support. A payload retention system is provided in U.S. Pat. No. 7,931,428 to Stille, but it deals with tie downs and securing of cargo. It does not provide for pedestal shoring for cargo doors, nor shoring used to prevent rolling stock from vertical movement other than in an upward direction. It does not prevent compression of the rolling stock but does provide for dampering of upward lift. The components of Stille involve a cable, a brake assembly, a hollow crushable member and a hollow structural member. No foam shoring material is identified within Stille.

A pallet restraint method is the subject of U.S. Pat. No. 6,695,554 to Afful deals with vertical restraint of pallets loaded onto cargo planes. The components disclosed within Afful uses a plurality of cams having upwardly oriented circular geared portions mounting on the side of the cargo bay. The pallet edges are inserted under the cams, which rotate to secure the pallet edges to the cargo bay floor. Locking levers and linear gears are also employed to prevent the secured cams from rotating. Shock absorbing bumpers lie on the upper surface of the pallets to prevent upward jolting during the transport flight. The bumpers appear to be a minimal type of shoring, but they exist to absorb shock generated between the palate and each cam. In U.S. Pat. No. 6,608,262 to Eiswerth, an aircraft load cell shoring is disclosed providing support while placing an aircraft wing with a jet engine attached for use with a load cell mounted on an aircraft jack. The load cell shoring forms a cradle meant to conform to the underside of the jet engine, and is presented with variable contours. The only padding mentioned within Eiswerth is a cushioning device 42. The definition of this cushioning device in Column 3, line 61, is " . . . may be in the form of a mat or protective covering." Eiswerth further defines a list including " . . . rubber, felt, textile material, an inflatable support. Plastic, gel or any type of device, system, apparatus or material that will provide support and prevent scratching or damage to the aircraft engine 9 or the cradle assembly 34, 36." I defines the preferred cushioning devices 42 as " . . . quarter inch thick felt." Column 4, line 1. Any matted fabric will do, including wool, fur or hair matted together by heat, moisture and great pressure. The cushioning device is also the subject of Claims 5 and 14.

The definitions of the above patents, alone or in combination do not support reference to the subject matter of the present airlift shoring structures, nor are they adapted for use for the same purpose, nor can they be adapted to provide for the same utility as the present airlift shoring structures.

II. SUMMARY OF THE INVENTION

Generally, during the loading and unloading process of cargo aircraft, certain types of cargo require that the aircraft cargo ramp be supported by pedestal shoring to reduce the possibility of damage to the aircraft. Depending on the characteristics of the cargo loaded onto the aircraft for transport, the cargo must be supported by sleeper shoring to prevent vertical movement of the cargo from compression of the suspension or bouncing during flight. Historically both the pedestal and sleeper shoring have been made of lumber, which is quite heavy—so much so that the weight of the shoring can affect the required takeoff distance, reducing airfield selection due to increased landing and takeoff distances. The additional weight can also reduce range of flight affecting the aircraft fuel load. Lumber is also the subject of insect infestation, causing delays in clearing U.S. Customs and Department of Agricultural inspections. Pedestal shoring and sleeper shoring made of lighter weight high-density foam structures instead of the currently used metal and lumber products of a much heavier weight addresses each of the above concerns, not to mention the reduction of injury to those responsible for the placement and carriage of the shoring materials.

III. DESCRIPTION OF THE DRAWINGS

The following drawings are submitted with this utility patent application.

FIG. 1 is a perspective view of a pedestal shoring structure.

FIG. 2 is a perspective view of an approach shoring structure.

FIG. 3 is a side view of an adjustable height pedestal shoring structure.

FIG. 4 is a cross sectional view of an outer coated shoring structure, including internal baffles or stiffeners.

FIG. 5 is a cross sectional view of a shoring structure containing an infused fabric mesh.

FIG. 6 is a view of a C-5 cargo plane with a ramp indicating placement and use of multiple pedestal shoring structures.

FIG. 7 is a view of a C-130 cargo plane with a horizontal ramp utilizing an adjustable height pedestal shoring structure.

IV. DESCRIPTION OF THE PREFERRED EMBODIMENT

Figure 8:
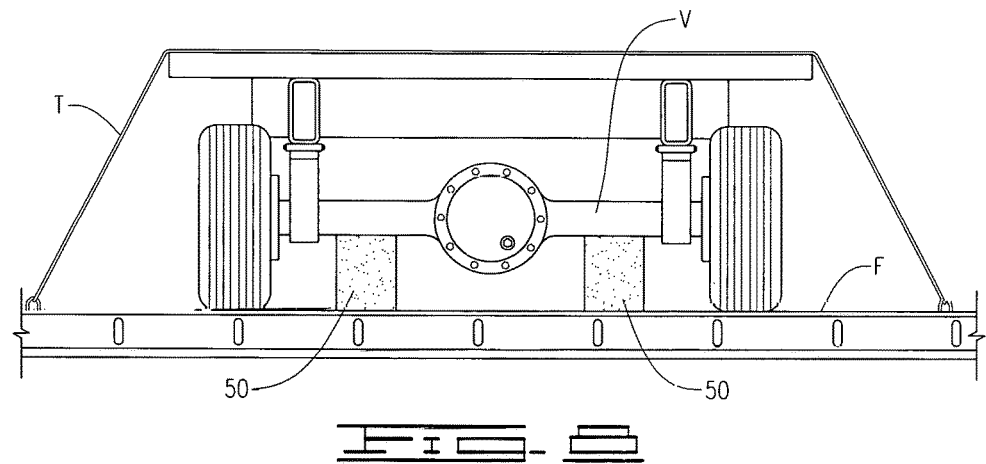
FIGS. 8-9 are views of mobile cargo within the cargo bay of an aircraft indicating use of sleeper shoring structures to absorb and prohibit downward vertical movement of the cargo during transport.

Pedestal shoring is not required at all times during the loading and unloading of a transport aircraft. The cargo ramps on the common transport planes, namely the C-17, the C-5 and the C-130 aircrafts commonly used by the military and commercial cargo transport divisions, have integrated ground support pads or equipment. When the cargo ramp is fully lowered and obviously when it is raised, there is no requirement for supplement shoring to prevent damage to the aircraft and specifically to the cargo loading system. Pedestal shoring is generally only required when the cargo ramp is between a fully lowered position and a fully horizontal position, FIG. 6. Likewise, not all cargo requires sleeper shoring, as defined above. Only that cargo which have compression or suspension systems which can cause the cargo to compress or to bounce during turbulent flight or during aggressive/tactical landings is recommended and sometimes required to use the sleeper shoring and secure tie-down while in flight, FIGS. 8-9.

The high density foam shoring structures 10 which are the subject of the present improvement to the military and commercial airlift cargo transport industry comprise high density shaped structures specifically shaped and sized for certain aircraft having cargo loading doors and those carrying cargo, primarily vehicular payloads with compression of suspension systems subject to vertical movement during operation of the aircraft. The high density shaped foam structures 10 are provided in two embodiments as illustrated in the drawing figures—fixed shape pedestal shoring 20, fixed shape approach shoring 30 and adjustable height shoring 40, FIGS. 1-7, and sleeper shoring 50, FIGS. 8-9, as turther defined within the specification.

By example, and as illustrated in FIG. 6, the C-5 cargo aircraft A lowers a cargo ramp B which provides for drive-on loading into the cargo bay C where the cargo ramp B is lowered to the ground with the cargo ramp supported by the integrated ground support pad. During normal pallet cargo loading, the cargo ramp is positioned in the horizontal position (co-planer with the cargo floor) where neither the integrated ground support pad or pedestal shoring is required because the cargo ramp never reaches the ground below the cargo ramp. However, when the cargo ramp is between the ground contact position and the horizontal position, pedestal shoring is useful and most often required. As shown in FIG. 6, fixed shaped pedestal shoring 20 or ramp pedestal shoring, FIG. 1 of a preferred dimension and approach pedestal shoring 30, FIG. 2, of a preferred dimension are required to prevent the cargo ramp from damage during the loading of heavy or drive-on cargo where the tail of the cargo plane is lowered due to the weight of the object being loaded as it is driven over the cargo ramp acting as a ramp. As many as eight high density foam shoring structures are required for adequate support of the cargo bay door. Recommended placement, shape and size requirements are base upon actual use of the high density compression foam structures in actual cargo loading trials and are not simply random selections for the C-5 cargo aircraft A.

By example the C-17 aircraft also requires fixed shaped pedestal shoring 20 and approach pedestal shoring 30, when the cargo ramp is positioned between the horizontal and ground positions. However, instead of eight recommended high density foam shoring structures 10, the C-17 requires only three high density foam structures for cargo ramp support during intermediate position loading. Again, recommended placement, shape and size requirements are base upon actual use of the high density compression foam structures in actual cargo loading trials and are not simply random selections for the C-17 cargo aircraft.

For the C-130 cargo aircraft X, FIG. 7, the useful pedestal shoring is officially referred to as the "Ramp Support", but unofficially it is referenced as the "C-130 Milkstool". The "Milkstool" is used every time a pallet is loaded into the cargo bay Z of the aircraft, even when the aircraft cargo ramp Y is in the horizontal position, which is an exception to the previously mentioned cargo aircrafts. It is carried on every C-130 aircraft X all the time because of its perpetual loading and unloading use. In some instances, several are carried. Loadmasters are constantly required to lift, carry and move the "Milkstool" into position. The wooden "Milkstools" of the current known products weigh at least 95 pounds each. They are the frequent cause of back injuries to loadmasters and cargo personnel. The wooden "Milkstool" is replaced by the high density foam adjustable height structure 40, FIG. 3, having a fixed base member 42 and one or more selective and adjustable structure members 44 respectively attached to the fixed base member by at least on section of fabric webbing 45 or other flexible cordage. The high density foam adjustable height structure 40 reduces the cargo and lift weight of the wooden "Milkstool" by 50% or more. This reduced weight meets the objectives indicated, with the reduced weight not only assisting in transport overall cargo weight, but also reduces the chance of injury to personnel by the 50% or greater weight reduction of the substitution of the currently used wooden version for the high density foam adjustable height structure 40 having the fixed base member 42 and two selective and pivotally attaching adjustable structure members 44, FIGS. 3 and 7.

Figure 9:
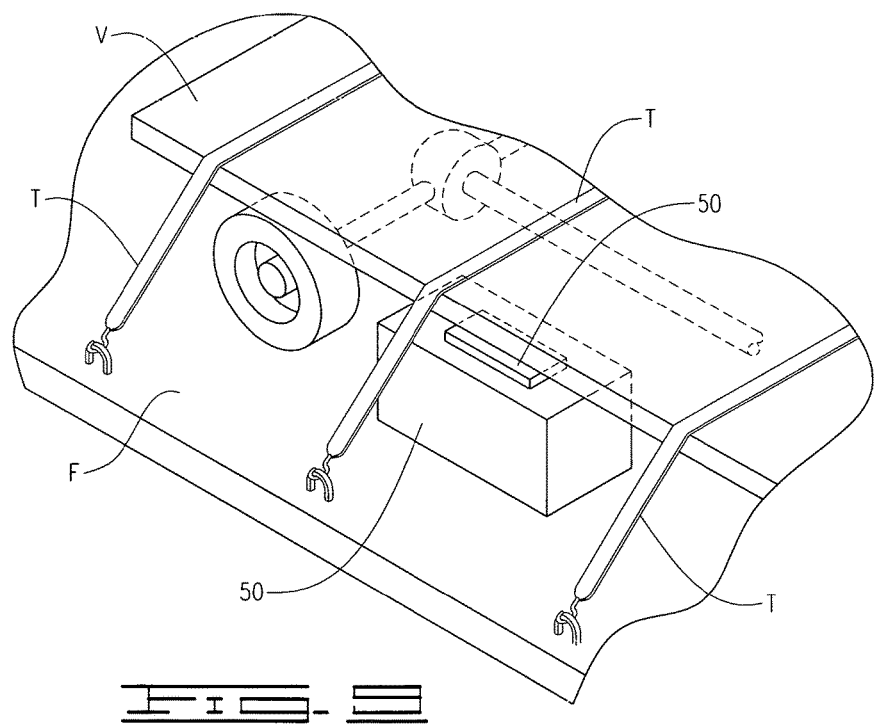

Addressing the high density foam sleeper shoring structures 50, FIGS. 8-9, vehicles V and trailers loaded into cargo aircraft are subject to forces of gravity and inertia during flight that would not be present during ground use. As mentioned, aggressive and tactical landings and in flight turbulence can subject the vehicles V and trailers to G-forces of 4 or more, which is 4 times the force of gravity. Vehicle suspensions are rated for certain weight carrying capacity. For aircraft cargo, loadmasters attempt to limit the actual axle weight to 80% the rated capacity (e.g. a 5,000 lb rated axle would be limited to 4,000 lbs.) Sometimes the 80% rule just cannot be met or followed. If axles do exceed the 80% optimal limitation, the sleeper shoring is placed under the frame F of the vehicles and trailers to keep the suspension from compressing. Sleeper shoring is almost always used in conjunction with tie-downs T or cinched chains, banding or strapping to secure the object to the cargo deck F within the cargo bay of the aircraft, FIGS. 8-9. The current use sleeper shoring is stacked lumber. The problems with lumber have been previously stated and summarized as too heavy, to cumbersome to flight fuel efficiency, handling and delay in time cased by inspections due to lumbers tendency to attract unwanted pest infestations. Replacement of the wooden sleeper shoring with high density foam shoring structures 50, once again, improves fuel efficiency of the cargo aircraft by significant reduction of weight, reduction of weight during handling, eliminating insect infestation. A marked improvement in flight efficiency, improved performance and reduction of injury to load personnel are just a few noticed advantages during testing of the high density foam structures used for sleeper shoring.

Each high density foam structure 10 comprises a shaped high density foam core 12 specifically of a size and shape found useful in aircraft cargo loading plane support as pedestal shoring or sleeper shoring or a combination of both. Each high density foam core 12 can be coated with a protective coating 14 of polymer or coated fabric covering, FIG. 4, and may incorporate an integrated fabric matrix 15 within the high density foam core 12, FIG. 5. Stiffeners and baffles 16 may also be incorporated within the high density foam core 12, FIG. 4. The approach shoring 30, is a polygonal shaped high density body 32 with an inclined ramp extension 34 extending from one direction, as indicated in FIGS. 2 and 6. The placement of each type shoring, as indicated in FIG. 6, wherein the fixed shaped (ramp) pedestal shoring 20 is placed under the aircraft cargo ramp under the cargo ramp and the approach shoring 30 extends forward beyond the end of the aircraft cargo ramp, not only for support of the cargo ramp but to present the inclined ramp extension 34 forward from the end of the cargo ramp B, Y, upon which vehicle wheels pass during loading. While the high density foam shoring structures 10 have been particularly shown and described with reference to a preferred embodiment thereof, it will be understood by those loadmasters skilled in the art that changes in form and detail may be made therein without departing from the spirit and scope of the invention.

What is claimed is:

1. A high density foam structure for use in the airlift cargo industry as a shoring block, said high density foam structure comprising:
    a polygonal high density foam core having a fixed shape for pedestal shoring used to support a cargo ramp of a cargo transport aircraft supplied in one or more shapes and sizes suited to support said cargo ramp of said cargo transport aircraft during loading and unloading of cargo said high density foam core further defines a protective coating of a polymer or fabric covering.

2. The high density foam structure of claim 1 wherein:
    said high density foam core further defines an integrated fabric matrix.

3. The high density foam structure of claim 1 wherein:
    said high density foam core further defines one or more internal stiffeners or baffles.

4. The high density foam structure of claim 1 wherein:
    said high density foam core further defines a protective coating of a polymer or fabric covering; and
    an integrated fabric matrix.

5. The high density foam structure of claim 1 wherein:
    said high density foam core further defines a high density foam body with an inclined ramp extension extending in one directions used as approach shoring with said body placed under said cargo ramp and said inclined ramp extension extending forward beyond said cargo door presenting said inclined ramp extension to accommodate vehicle wheels unto said cargo ramp during loading and unloading of said vehicle into said cargo transport aircraft.

6. High density foam structures for use in the airlift cargo industry as a shoring block, each said high density foam structure comprising:
    a polygonal high density foam core having a fixed shape for sleeper shoring used to support a vehicle or trailer having a suspension, said sleeper shoring used in conjunction with tie-downs securing said vehicle to said cargo deck within said cargo bay of a cargo transport aircraft, said one or more high density foam structure being placed under said vehicle to prevent compression movement of said suspension between said vehicle and said cargo deck during transport flight of said cargo transport aircraft.

7. The high density foam structure of claim 6 wherein:
    said high density foam core further defines a protective coating of a polymer or fabric covering.

8. The high density foam structure of claim 6 wherein:
    said high density foam core further defines an integrated fabric matrix.

9. The high density foam structure of claim 6 wherein:
    said high density foam core further defines one or more internal stiffeners or baffles.

10. The high density foam structure of claim 6 wherein:
    said high density foam core further defines a protective coating of a polymer or fabric covering; and
    an integrated fabric matrix.

11. An adjustable height high density foam structure for use in the airlift cargo industry as a shoring block, said high density foam structure comprising:
    a high density foam fixed base member;
    at least one high density foam adjustable member; and
    at least one section of flexible fabric webbing attaching said at least one said high density foam adjustable member to said high density foam base member, wherein said adjustable member may selectively be placed upon said fixed base member providing said adjustable height high density foam structure with an increase height versus said fixed base member alone, said adjustable height high density structure placed under a cargo ramp of a cargo transport aircraft to support said cargo ramp of said cargo transport aircraft during loading and unloading of cargo.

12. The high density foam structure of claim 11 wherein:
    said high density foam fixed base member and said at least one high density foam adjustable structure further define a protective coating of a polymer or fabric covering.

13. The high density foam structure of claim 11 wherein:
    said high density foam fixed base member and said at least one high density foam adjustable structure further define an integrated fabric matrix.

14. The high density foam structure of claim 11 wherein:
    said high density foam fixed base member and said at least one high density foam adjustable structure further define one or more internal stiffeners or baffles.

15. The high density foam structure of claim 11 wherein:
    said high density foam fixed base member and said at least one high density foam adjustable structure further define a protective coating of a polymer or fabric covering; and
    an integrated fabric matrix.

* * * * *